July 27, 1926.
N. A. SPEILBERG
HOSE CLAMP
Filed March 8, 1926
1,594,026
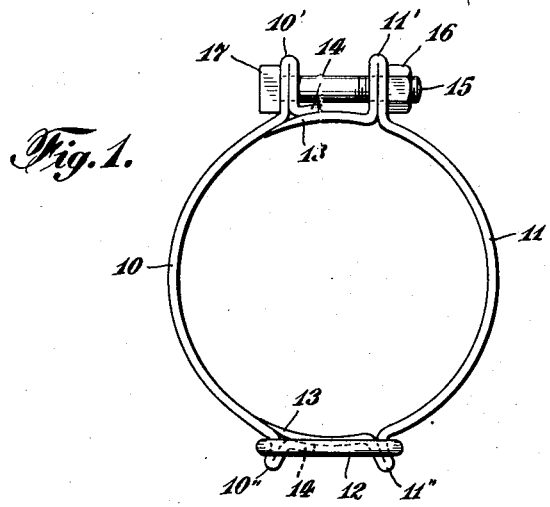
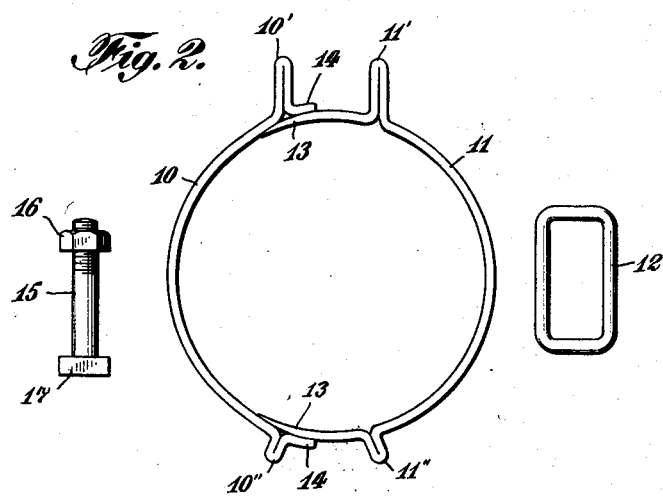
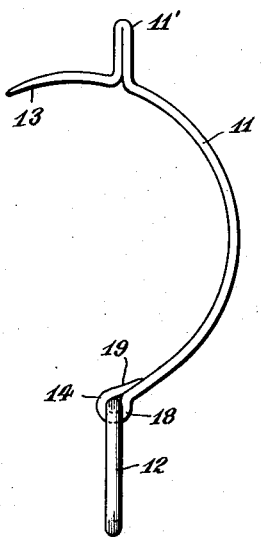
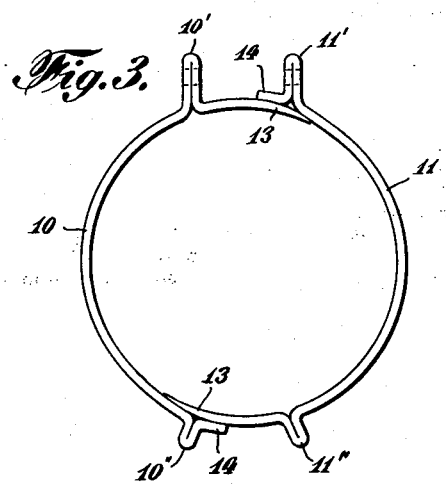
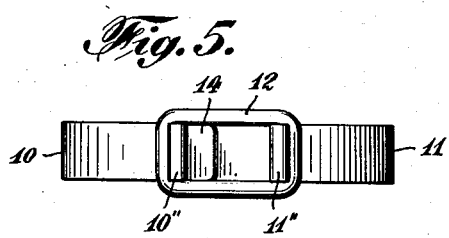
INVENTOR
Norman A. Speilberg
BY
Peter M. Boesen
ATTORNEY Patented July 27, 1926.

1,594,026

UNITED STATES PATENT OFFICE.

NORMAN ALEXANDER SPEILBERG, OF JERSEY CITY, NEW JERSEY.

HOSE CLAMP.

Application filed March 8, 1926. Serial No. 93,084.

This invention relates to hose-clamps and has for its object to produce a specimen that will prove easily adjustable, and which will at all times assure a snug and close fitting of the members to be connected.

This invention is mainly applicable where a hose, rubber, or any kind of a flexible tube is to be snugly and safely connected to a rigid outlet, or pipe.
While the scope of application of my invention is very wide, I shall especially point out the essential importance of my invention in regard to the railroads, cars and locomotives, where hose connection is to be found between the engine and tender, and where my invention has proved very effective. A similar use for my invention will be found in regard to automobiles and in numerous other fields.
The advantages of this invention will appear as the description proceeds.

With the above and other objects in view, the invention consists of the novel features of construction, combination and arrangements of parts, hereinafter fully described, claimed and illustrated in the accompanying drawings forming part of this specification, in which similar characters of reference indicate corresponding parts in all views, and in which:

Figure 1 is a front elevation of the embodiment of my invention; Figure 2 is a detail sectional view of the cylindrical clamping members taken apart and also showing a bolt and ring as part of this invention; Figure 3 is a similar view illustrating a different form of my invention, while Figure 4 illustrates another feature that may be introduced into same and is quite within the scope of this invention, and Figure 5 illustrates a bottom view of same.

The hose-clamp comprises two half cylindrical members 10 and 11, as shown, each member has two projections, an upper and a lower, bent upon itself and indicated, these referring to 10 by the numerals 10' and 10" and these referring to 11 by 11', and 11", respectively.

The lower projections 10" and 11" have a slight outward bend forming an angle of less than 90 degrees with its bottom, and adapted to receive a ring or member 12.

In placing the member 11, which as well as 10, is of a springy nature around a hose and pipe, which are to be securely connected, and afterward closing the circle with placing the member 10 opposite the member 11, it will be seen that the flat-faced tapered projections 13, 13 of member 11 overlaps the adjoining end pieces 14, 14 of member 10, thereby contributing to a snug and compact fitting of said hose and pipe. A ring or member 12 is placed around the projections 10" and 11" thereby clasping the lower joints snugly together, while the upper joints are kept in close proximity by applying a screw bolt 15, which penetrates the two upward projections, or ears, 10' and 11', and is tightened by a hexagonal screw-nut 16. It will be seen that to secure steadiness of movement in applying said screw-nut to said bolt it is of importance that the screwhead 17, which is integral with the bolt, is of a square shape and placed as near the bottom of said ear as possible, thereby giving strength to said closing or tightening movement. It is evident that the hexagonal nut 16 is placed in correspondingly low position for a similar purpose. While as showing in Figure 2, the member 11 has two extensions or overlapping projections 13, this invention may be constructed in such a manner that each half cylindrical ring has one such projection respectively above or below as shown in Figure 3, whereby the tension in placing said ring around a joint is mainly eliminated as the two semi-rings practically meet on the diametrical line.

Another aspect well within the scope of this invention is the termination of the lower end piece 14 into an eyelet or hook 18 fastened around the ring 12, as shown in Figure 4, to secure the presence of said ring-member. In this instance the inwardly bent part 19 of the hook is flatly tapered and adapted to rest against the overlapping projection 13, giving further strength to each ring-joint.

While I have shown and described the preferred embodiment of my invention, it is to be understood that many minor modifications may be resorted to within the scope of the invention, and I do not, therefore, desire to be limited to the precise construction illustrated in the drawings.

Having thus fully described my invention, what I desire to claim and protect by Letters Patent is:

1. A hose-clamp comprising two half-cylindrical sections, each section provided with two projections, bent upon themselves for engagement with a screw-bolt inserted